US008654515B2

(12) United States Patent
Krische

(10) Patent No.: US 8,654,515 B2
(45) Date of Patent: Feb. 18, 2014

(54) HOUSEHOLD APPLIANCE

(75) Inventor: Bernd Krische, Saltsjö-Boo (SE)

(73) Assignee: Electrolux Home Products Corporation, N.V. (BE)

( * ) Notice: Subject to any disclaimer, the term of this patent is extended or adjusted under 35 U.S.C. 154(b) by 193 days.

(21) Appl. No.: 13/127,648

(22) PCT Filed: Nov. 3, 2009

(86) PCT No.: PCT/EP2009/007870
§ 371 (c)(1),
(2), (4) Date: Jul. 14, 2011

(87) PCT Pub. No.: WO2010/051968
PCT Pub. Date: May 14, 2010

(65) Prior Publication Data

US 2011/0261518 A1 Oct. 27, 2011

(30) Foreign Application Priority Data

Nov. 4, 2008 (EP) .................................... 08019304

(51) Int. Cl.
*G06F 1/16* (2006.01)

(52) U.S. Cl.
USPC .................. 361/679.01; 248/316.1; 219/492; 34/596

(58) Field of Classification Search
USPC ............. 219/402, 506, 481, 492; 307/23, 35; 34/86, 130, 108, 595, 486, 596; 15/415, 327.2; 361/679.01, 679.21, 361/679.4, 679.31, 679.27, 679.09, 679.28, 361/679.26, 679.55, 679.41, 679.06, 361/679.02, 679.04, 679.3; 248/316.1, 500, 248/533, 223.11, 225.11
See application file for complete search history.

(56) References Cited

U.S. PATENT DOCUMENTS

| | | | | |
|---|---|---|---|---|
| 5,694,831 | A * | 12/1997 | Haroun et al. | 99/339 |
| 7,943,945 | B2 * | 5/2011 | Baretz et al. | 257/98 |
| 2008/0099461 | A1 * | 5/2008 | Li | 219/402 |

FOREIGN PATENT DOCUMENTS

| | | | |
|---|---|---|---|
| EP | 1947552 | A | 7/2008 |
| JP | 2003122286 | A | 4/2003 |
| WO | 03014638 | A | 2/2003 |
| WO | 2004068448 | A | 8/2004 |
| WO | 2005045793 | A | 5/2005 |

OTHER PUBLICATIONS

International Search Report, Jan. 2010.

* cited by examiner

*Primary Examiner* — Hung Duong
(74) *Attorney, Agent, or Firm* — Banner & Witcoff, Ltd.

(57) ABSTRACT

There is provided a household appliance including a housing and a cavity arranged within the housing. The housing element is further arranged to allow viewing of the cavity. A display which is transparent to at least one wavelength in the visible light spectrum is arranged in connection to the housing element and is further arranged such that the cavity is exposed from outside the household appliance. The display is a thin film type electroluminescent display which is arranged as an integral part of the housing element.

21 Claims, 2 Drawing Sheets

HOUSEHOLD APPLIANCE

This application is a national stage application of co-pending PCT application PCT/EP2009/007870 filed Nov. 3, 2009, the disclosure of this application is expressly incorporated herein by reference in its entirety.

TECHNICAL FIELD

The present invention generally relates to a household appliance comprising an electroluminescent display.

DESCRIPTION OF RELATED ART

Household appliances such as ovens and laundering machines are traditionally equipped with a user interface that permits a user to control and monitor the appliance. The user interface typically comprises user operable buttons, or protruding knobs. More recently the user interface may also comprise a display to provide the user with information regarding e.g. the functionality and the present state of the household appliance. Thus, displays in user interfaces are important functional and design features of the modern household appliance.

To be user-oriented, the user interface and/or the display must be placed on an accessible side of the household appliance. Thus, space available for implementation of the displays is often limited to the top or the front frames of the house hold appliance. Due to the limited space, and also for cost reasons, the displays are thus typically rather small.

It is known to utilize electroluminescent devices, such as electroluminescent displays (ELDs) in household appliances. An ELD is a luminous type display device. Luminous type display devices further include e.g. cathode ray tubes (CRT) and light emitting diodes (LEDs) and are characterized by having pixels that emits visible light. The ELD is typically a flat panel display containing at least one thin film light emitting layer, comprising e.g. an electroluminescent substance phosphor, which is sandwiched between two electrodes, at least one of which has to be transparent, and supported by an insulating substrate. Mostly ELDs are manufactured on a black background to increase contrast and visibility. However, transparent back electrode materials, like e.g. thin film ITO, may be utilized to provide transparent ELDs. The electrodes are arranged as addressable pixels or areas. When an electric field is provided for a pixel/area, i.e. the pixel is switched on, the phosphor layer in between the active electrodes emits visible light. This is an electroluminescent phenomenon, wherein light is generated when an electric field or current of a certain intensity is applied to the electroluminescent substance.

US2006/0201181 A1 discloses a refrigerating appliance comprising an internal lighting system including organic light-emitting diodes (OLEDs), which are integrated in the housing for uniformly illuminating the interior of the refrigerating appliance. Here the OLEDs are utilized as light sources arranged inside the household appliance.

EP 1 460 609 A2 discloses a transparent programmable display comprising rows and columns of surface mounted light emitting diodes (LEDs) for displaying messages to an observer. The programmable display may be utilized as a cooler door. The manufacturing of the display comprises several techniques like evaporation techniques for ITO-covered glass substrates, laser cutting of electrodes, surface mounting of components etc.

SUMMARY

It is an object of the present invention to provide an improved household appliance.

This and other objects that will be evident from the following description are achieved, according to an aspect of the invention, by means of a household appliance comprising a housing, a cavity within the housing, a housing element, which is arranged to allow viewing of the cavity, and a display, which is arranged in connection to the housing element. The display is transparent to at least one wavelength in the visible light spectrum, and is arranged such that the cavity is exposed from outside the household appliance. Furthermore, the display is a thin film type electroluminescent display arranged as an integral part of the housing element.

Thus, there is provided a household appliance whereby it is possible to utilize a large area of the housing, or more particularly the housing element, to view for instance household appliance related data to the user. The display may further provide any desirable information and/or adornments via the integrated electroluminescent display. Furthermore, a transparent electroluminescent display is integrated in the housing element, which advantageously allows for exposing the internal cavity of the household appliance. This is achievable simultaneously with presenting data in the form of text, pictures, ornamentation or other design features on the housing element. The transparent electroluminescent display presents the data via the bright luminous pixels which are integrated in the housing element. The electroluminescent display provides a sharp, clear image and wide viewing angles. Electroluminescent displays allows for very high mechanical stability designs, and have been known to be utilised in demanding applications like in instrumentation for rugged military, transportation and industrial applications. Furthermore, the electroluminescent display typically shows a high performance within a wide temperature range which is advantageous. The housing element with the integrated electroluminescent display is rather inexpensive to manufacture and may be integrated in rather thick glass substrates that are advantageous to use in rough environments.

In accordance with an embodiment of the household appliance, the housing element constitutes at least a part of one of a door, a sidewall, and a top panel of the housing, which is advantageous for utilizing a large area of the housing of the household appliance for providing a view of the interior of the device while also displaying information in an attractive way. This allows for freedom of design of the household appliance.

In accordance with an embodiment of the household appliance, the household appliance further comprises control means for controlling the operation of the household appliance. The display is arranged in communication with the control means. This enables for displaying current data of the performance of the household appliance on the housing element.

In accordance with an embodiment of the household appliance, the household appliance further comprises detection means for detecting an action performed by a user, and for generating signals to the control means in response to the action. Thus, user interaction may be detected and signaled to the control means of the household appliance.

In accordance with an embodiment of the household appliance, the detection means comprise one of a touch pad panel, a proximity sensor, a pushbutton, a predetermined sensing area utilizing for instance capacitive sensing, or means for independent localisation of where a user points or clicks on a surface based on IR or sound/vibration localisation.

Hence, the detection means may be realized by means of different techniques depending of the specific demands of a certain household appliance and/or preferred design.

In accordance with an embodiment of the household appliance, the household appliance further comprises a lighting device, which is arranged inside the cavity. Furthermore, a lighting area is alternatively or additionally arranged in the display. The lighting device and/or the lighting area is controllable by the activation of the detection means.

Hence, the amount of energy utilized to illuminate the household appliance cavity is restricted to when a user is actually in need of illuminating the cavity and accordingly activates the detection means. The activation may be provided by pushing a pushbutton or, when the detection means are realized with a proximity sensor, a user activates the sensor by being present in the direct vicinity of the household appliance. In both cases the user must be in the direct vicinity of the household appliance for the illumination to be activated.

In accordance with an embodiment of the household appliance, a portion of the housing element is further transparent to at least one wavelength in the infrared area. The portion of the transparent housing element is provided with infrared to visible light converting means. This way the housing portion is provided with a self activating information area, by which a user can retrieve information regarding the temperature of (the cavity of) the household appliance or items therein, e.g. in a microwave oven. For example, if the household appliance is an oven, the portion provided with infrared to visible light converting material emits light when the interior oven cavity is hot. This may be utilized to alert the user that the oven has reached a predetermined temperature value etc. Different thresholds of the activating temperature may be set to achieve stepwise indication of the temperature. In an appliance with a cavity that is not heated but only the food items (e.g. in a microwave oven), these items will thus be displayed when getting hot and giving possibly information on the temperature profile over the item.

In accordance with an embodiment of the household appliance, the infrared to light converting means comprise one of an electronically coupled up-conversion material "ECUC-material", and an optically coupled up-conversion material "OCUC-material", which is advantageous.

In accordance with an embodiment of the household appliance, the household appliance is one of an oven, a microwave oven, a steam oven, a refrigerator, a wine cooler, a freezer, a pantry, a dishwasher, a laundering machine, and a tumbler dryer. Thus, the present inventive concept is applicable in a variety of household appliances.

In accordance with an embodiment of the household appliance, the housing element comprises a multiple pane window arrangement.

In accordance with an embodiment of the household appliance, the display and/or detection means are arranged on at least one of the inner sides of the multiple pane arrangement.

It is an advantage with some embodiments of the invention that they provide for improved freedom of designing the household appliance, and a more robust integration of a display in a household appliance. Household appliances are often utilized in rough environments. In kitchens there is e.g. cooking grease, liquids, in laundry room there are a high concentration of dust particles from clothing and high water content in the air etc. Keeping a household appliance in perfect condition is a rather circumstantial task. By integrating the display in the housing the cleaning is reduced to wiping off a glass surface or similar.

When in addition detection means are integrated in the housing portion, and preferably with activation in association with the display, the hygiene may be even further optimized as cleaning of the surfaces of the housing now becomes an easy task for the user, as compared to cleaning protruding control knobs. Furthermore, it is an advantage with some embodiments of the invention that they provide a user-friendly and intuitive way of providing information regarding the household appliance functionalities to a user from a distance. The information is luminous, whereby the data may be monitored even without having to turn on the illumination of the premises.

Furthermore, it has been found that sufficient visibility is ensured when such a transparent display is placed in front of a cavity that is not actively illuminated. Many household appliances contain a large cavity that is accessible by a closable door that often includes a window to allow observation of the goods in the cavity. The window area is rather large and a significant design element but otherwise not active. One of the objectives of the present inventive concept is thus to utilise the window not only for viewing but also for user interface functions like the display and input from the user, and in addition lighting functions as described by the embodiments of the present invention. Including such functions into the window frees space otherwise occupied by user interface and illumination elements and allows for rather innovative designs.

Furthermore, integrating such functions into the window makes assembly easier and faster as mounting of the otherwise plurality of elements for the user interface and illumination is avoided. Connecting power and signal lines to a door is known to those skilled in the art and featured in for instance most dishwasher doors. But, of course, the active window does not need to be part of a movable door.

The above mentioned functions are integrated onto the substrate of the window by state of the art electroluminescent display manufacturing techniques as known to those skilled in the art of thin film lithography.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

Unless otherwise defined, all terms (including technical and scientific terms) used herein have the same meaning as commonly understood by one of ordinary skill in the art to which embodiments of the present invention belong. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

Embodiments of the present invention will now be described in more detail, reference being made to the enclosed drawings, in which.

DETAILED DESCRIPTION OF EMBODIMENTS

Embodiments of the present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
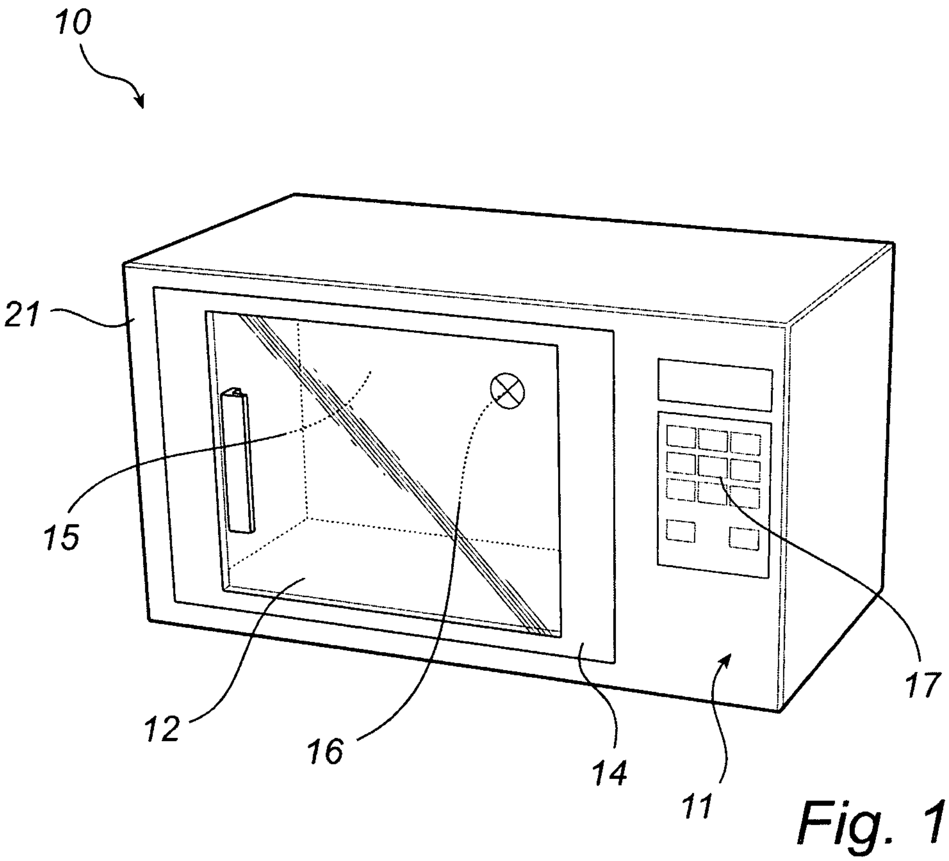
FIG. 1 is an illustration of an embodiment of a household appliance according to the present invention.

FIG. 1 illustrates an exemplifying embodiment of a household appliance according to the present invention. However, it should be emphasized that the present inventive concept is applicable to a number of household appliances such as e.g. an oven, a microwave oven, a steam oven, a refrigerator, a wine cooler, a freezer, a pantry, a dishwasher, a laundering machine, or a tumbler dryer. For the sake of simplicity only a microwave oven is illustrated in the exemplifying embodiment of the present invention.

Referring now to FIG. 1, the microwave oven 10 comprises a housing 11, which encloses a cavity 15. The cavity 15 is arranged to receive the food to be heated, which food is loaded by a user via an aperture arranged in the front side of the housing 11. A door 14 is arranged on the front side of the housing 11, to in a closed position of the door 14 cover the aperture such that the microwave oven cavity 15 may be enclosed within the housing 11. The door 14 comprises a display 12 which allows a user to view the cavity 15, even when the door 14 is closed. The display 12 is a thin film type electroluminescent display and is transparent to at least one wavelength in the visible light spectrum.

Figure 2:
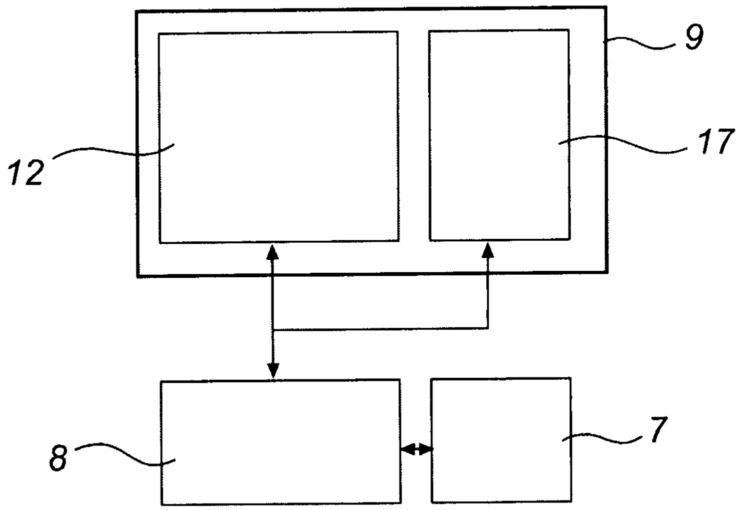
FIG. 2 is a schematic block diagram illustrating the functional structure of an embodiment of a household appliance according to the present invention.

Referring now to FIG. 2, the functionality of an embodiment of a household appliance in accordance with the present invention is illustrated. The microwave oven 10 further comprises control means 8, which are arranged to control and monitor functional components 7 needed for the main functionality of the household appliance.

The functional components 7 are specific for the individual type of household appliance. As an example, the functional components for a microwave oven may comprise a magnetron to produce an intense beam of microwaves, a power relay that allows the control means to turn on and off the magnetron, a power transformer that produces the high voltage electricity needed by the magnetron, a power rectifier that converts the alternating current from the transformer into the direct current needed by the magnetron, a capacitor that smoothes out ripples in the direct current leaving the rectifier, and a wave guide that transports the microwaves from the magnetron to the cooking chamber, and temperature sensors etc. None of the above is illustrated in the figures.

The control means 8 are further arranged to communicate with a user interface 9, through which the user may interact with the household appliance 10. The control means 8 may comprise a micro-processor (or a CPU), storage etc. I/O-units etc. The user interface 9 comprises the display 12 through which household appliance specific information, e.g. present state of the household appliance 10, may be communicated from the control means 8 to the user. Other arbitrary information or ornamentations may also be displayed by the display 12.

In an embodiment of the invention the user interface further comprises detection means 17. The detection means 17 are arranged for detecting actions performed by the user, and are further arranged for generating a signal to the control means in response to the actions. The detection means 17 may comprise a touch pad panel, a proximity sensor, pushbuttons, a predetermined sensing area, utilizing for instance capacitive sensing, or means for independent localisation of where a user points or clicks on a surface based on IR or sound/vibration localisation.

Figure 3:
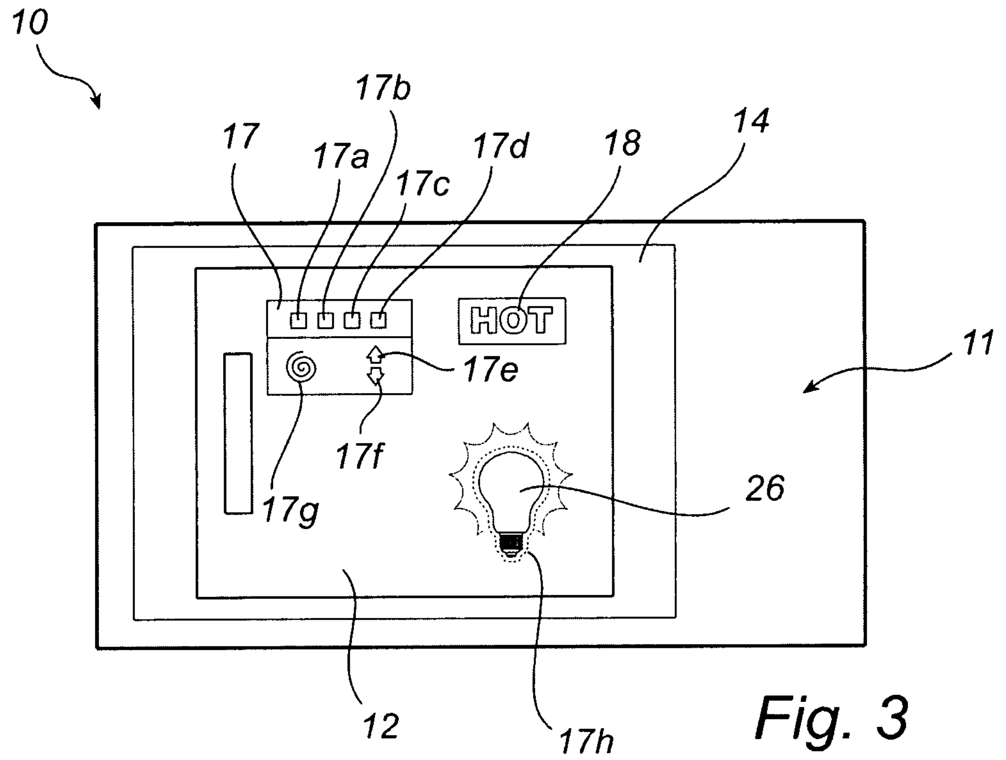
FIG. 3 is a schematic front view of an embodiment of a household appliance according to the present invention.

A schematic front view of an embodiment of a household appliance according to the present invention is illustrated in FIG. 3. The housing element 14, which here is represented by the door in the microwave oven 10, is arranged on the front side of the household appliance 10. However, it should be noted that the housing element 14 is not limited to this arrangement. The housing element may be a window, a door arranged in a sidewall, or a top panel of the household appliance.

The housing element 14 comprises the display 12 arranged as an integral part of said housing element 14. In addition to displaying information to the viewer, the housing element 14 may comprise the detection means 17.

In an embodiment according to the present invention, the detection means 17 are arranged having printed selection areas and touch sensitive sensors. An action performed by a user, e.g. when a user points at a printed selection buttons the action is detected by corresponding touch sensitive sensors, 17*a*-*g*, which are at least partly incorporated in and/or outside an outer panel of the housing element 14. The printed selection areas may illustrate certain functionalities of the household appliance 10, wherein the detection means 17, in response to the user pressing on the printed selection areas, sends a signal to the control means 8 for further processing. As an alternative to printing the selection areas, the selection areas may be realized by symbols displayed on the display 12.

In an embodiment the household appliance 10 comprises a lighting device 16 arranged inside the cavity 15. The detection means 17 may comprise a printed symbol and corresponding touch sensitive sensor 17*e* for activating the lighting device 16. Alternatively the printed symbol is arranged as a symbol viewed on the display 12.

In an alternative embodiment a lighting area 26 is arranged as part of the luminous display 12. Pixels in an area 26 of the display are utilized as a illuminating source. The position, size and shape of the lighting area 26 may be changed in time, selectable by the user etc. The illumination means are preferably localized as a band/border at the outside rim of the window in order not to obstruct the view into the cavity and to give sufficient brightness within the cavity.

In alternative embodiments the detection means 17 can be implemented by predetermined sensing areas, utilizing for instance capacitive sensing, or by means of independent localisation of where a user points or clicks on a surface. This may be based on e.g. IR or sound/vibration localisation as is known to those skilled in the art of sensing and input devices for use in detection means.

In an alternative embodiment of the present inventive concept, the display 12 may additionally and advantageously be utilized for viewing adornments of the household appliance. Attractive adornments or texts may be statically displayed or changed with time. When the household appliance has not been in use for a predetermined time a pause motive can be displayed. A user may choose from a list of available concepts of adornments and/or texts or add their own creations.

In an embodiment of the present invention the housing element 14 is arranged having a portion 18 of the housing element 14, which is further transparent to at least one wavelength in the infrared area. The portion 18 of the transparent housing element is provided with infrared to visible light converting means. In FIG. 3, the portion 18 is arranged having the word “HOT” arranged with infrared to visible light converting means. The infrared to light converting means are realized by printing an electronically coupled up-conversion material “ECUC-material”, or alternatively an optically coupled up-conversion material “OCUC-material” in a predetermined layer in a transparent path of the housing element 14, which transparent path is further transparent to at least one wavelength in the infrared spectrum. When the cavity temperature reaches a predetermined temperature the ECUC-material forming the letters “HOT” (or alternatively OCUC-material) are reached by infrared wavelengths and starts emitting visible light. With larger sized areas of light converting means this can be used to display a hot item in a colder cavity.

In the present invention, a housing element, which in the exemplifying embodiment is a door 14, comprises a window with an integrated thin film type electroluminescent display 12. The electroluminescent display is an electroluminescent device (ELD). In its basic structure, an ELD device is arranged in a stack comprising thin film layers, which are formed on a substrate. The substrate is typically a rigid isolator like glass. The ELD device further comprises a transparent electrode located on one surface of the substrate, an inorganic or organic light emitting layer located on a side of the electrode opposite to the substrate, and a back electrode located on the other side of the light emitting layer. Dielectric layers may be inserted between the light emitting layer and the electrodes. Thus ELDs are quite similar to capacitors except for the phosphor layer.

The light-emitting layer may comprise a number of thin film layers depending on the material used.

As an example, an organic light-emitting layer is typically configured as a diode and comprises multiple-layers including an emitting layer (EML), an electron transport layer (ETL), and a hole transport layer (HTL) for improving light-emitting efficiency by balancing electrons and holes, and further includes a separate electron injecting layer (EIL) and a hole injecting layer (HIL).

As it can be deduced from the details above, ELD devices can be classified into inorganic or organic ELD devices depending upon source material for the electroluminescent substance. Organic ELD devices typically render high quality natural colours which may include the entire visible light range. Furthermore, organic ELDs are known to have high brightness and a low driving voltage (typically about 5-15 V, which is advantageous for manufacturing and designing of a driving circuit), high contrast ratio, a simple manufacturing process which enables a relatively low level of environmental contamination, an practically unlimited viewing angle and is stable at low temperature conditions. Inorganic ELD devices are typically characterized by higher driving voltages as compared to organic ELD devices. However, due to their solid-state nature of the inorganic phosphors they have a longer expected life time and operating temperatures ranges which at least cover −50° C. to 85° C. Unlike many other display technologies these displays are instant on at −50° C. Furthermore, typical viewing angles exceed 160 degrees in both horizontal and vertical angles with essentially no chromatic aberrations in a displayed image.

Figures 4A, 4B, 4C, 4D:
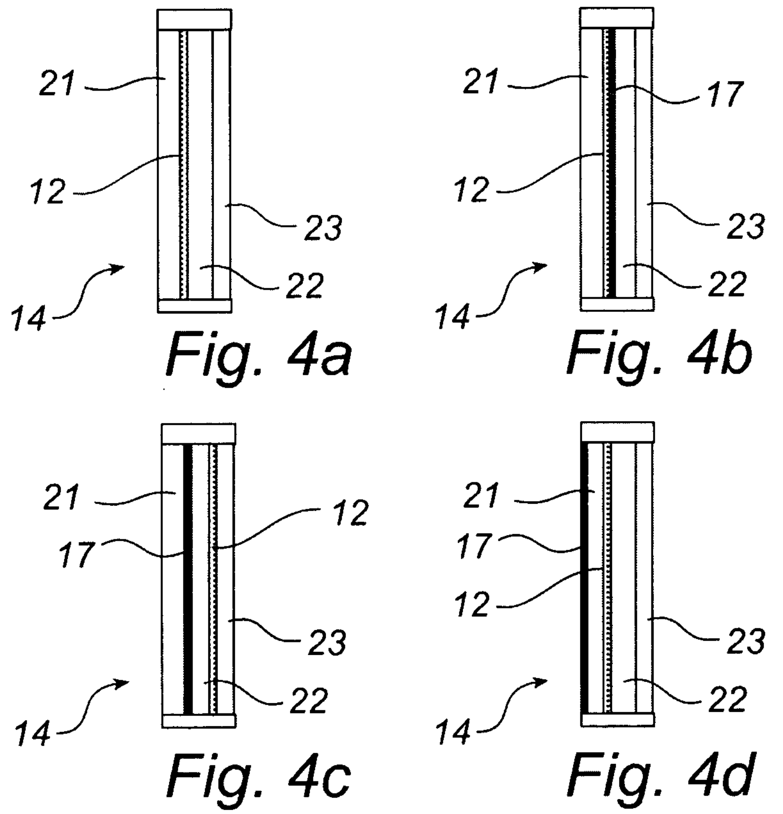
FIG. 4*a*)-*d*) each show a cross-sectional side view of a housing element in alternative embodiments of a household appliance according to the present invention.

In FIG. 4$a$)-$d$) cross-sectional side views of embodiments of a housing element in a household appliance according to the present invention are illustrated. In these embodiments, the housing element 14 and the display 12 and/or the detection means 17 are arranged in a multiple pane window arrangement. Referring now to FIG. 4$a$), the housing element 14 comprises an outer window pane 21, which may be made of glass. A display 12 is arranged to bear against the outer window pane. Alternatively the window pane 21 is arranged to constitute the substrate upon which the stacked thin film structure of the electroluminescent display is formed during the manufacturing process. Further the multiple pane window arrangement comprises an inner pane 23 which is arranged closest to the cavity. An insulating layer 22 is arranged between the inner pane 23 and the display 12. The insulating layer 22 may comprise a transparent solid material or be an air gap. The main areas of the panes 21, 22, 23 and the display 12 are transparent to at least one wavelength in the visible light spectra.

Similarly, another embodiment of the multiple pane window arrangement of a housing element 14 is illustrated in FIG. 4$b$). Here an additional detecting layer 17 is arranged in-between the display 12 and the insulating layer 22. In FIG. 4$c$) the detecting layer 17 is arranged between the outer pane 17 and the insulating layer 22, while the display is formed between the insulating layer 22 and the inner pane 23. The outer pane 17 and the inner pane 23 may act as a substrate to form the detecting means 17 and the display 12 upon, respectively.

Yet another embodiment similar to the embodiment as described with reference to FIG. 4$a$) is shown in FIG. 4$d$), wherein detecting means 17 are arranged on the outer side of the outer pane 21. This embodiment is advantageous when the detecting means 17 are arranged as pushbuttons or similar, wherein the user must press directly onto the detecting means 17.

The outer pane 21 and the inner pane 23 may comprise inter alia flat or shaped glass, hardened glass, strengthened glass, fiber glass, suitable polymeric materials as polycarbonate (PC), PET, PVC, PP, SAN, PS.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A household appliance comprising:

a housing;

a cavity within said housing;

a housing element, which is arranged to allow viewing of said cavity;

a display being arranged in connection to said housing element, wherein said display is transparent to at least one wavelength in the visible light spectrum, and is arranged such that said cavity is exposed from outside said household appliance, and wherein said display is a thin film type electroluminescent display arranged as an integral part of said housing; and a controller, arranged in communication with the display, that is configured to control operation of the household appliance and the display.

2. A household appliance according to claim 1, wherein said housing element constitutes at least a part of one of a door, a sidewall, and a top panel of said housing.

3. A household appliance according to claim 2, wherein the controller comprises a control means for controlling the operation of the household appliance, and wherein said display is arranged in communication with said control means.

4. A household appliance according to claim 3, comprising detection means for detecting an action performed by a user, and for generating signals to the control means in response to said action.

5. A household appliance according to claim 4, wherein said detection means comprises of at least one of a touch pad panel, a proximity sensor, a pushbutton, or a predetermined sensing area, utilizing for instance capacitive sensing and means for independent localization of where a user points or clicks on a surface based on IR or sound/vibration localization.

6. A household appliance according to claim 5, further comprising at least one of a lighting device arranged inside said cavity and a lighting area arranged in said display, wherein said one of said lighting device and said lighting area is controllable by activation of said detection means.

7. A household appliance according to claim 6, wherein a portion of said housing element is further transparent to at least one wavelength in an infrared area, and wherein said portion is provided with infrared to visible light converting means.

8. A household appliance according to claim 7, wherein said infrared to light converting means comprises one of an electronically coupled up-conversion material (ECUC-material) and an optically coupled up-conversation material (OCUC-material).

9. A household appliance according to claim 8, wherein the household appliance is one of an oven, a microwave oven, a steam oven, a refrigerator, a wine cooler, a freezer, a pantry, a dishwasher, a laundering machine, or a tumbler dryer.

10. A household appliance according to claim 9, wherein the housing element comprises a multiple pane window arrangement.

11. A household appliance according to claim 10, wherein both said display and said detection means are arranged on at least one inner side of said multiple pane arrangement.

12. A household appliance according to claim 11, wherein said infrared to light converting means comprises one of an electronically coupled up-conversion material (ECUC-material) and an optically coupled up-conversation material (OCUC-material).

13. A household appliance according to claim 12, wherein the household appliance is one of an oven, a microwave oven, a steam oven, a refrigerator, a wine cooler, a freezer, a pantry, a dishwasher, a laundering machine, or a tumbler dryer.

14. A household appliance according to claim 4, further comprising at least one of a lighting device arranged inside said cavity and a lighting area arranged in said display, wherein said one of said lighting device and said lighting area is controllable by activation of said detection means.

15. A household appliance according to claim 1, wherein a portion of said housing element is further transparent to at least one wavelength in an infrared area, and wherein said portion is provided with infrared to visible light converting means.

16. A household appliance according to claim 1, wherein the household appliance is one of an oven, a microwave oven, a steam oven, a refrigerator, a wine cooler, a freezer, a pantry, a dishwasher, a laundering machine, or a tumbler dryer.

17. A household appliance according to claim 16, wherein the housing element comprises a multiple pane window arrangement.

18. A household appliance according to claim 17, wherein said display is arranged on at least one inner side of said multiple pane arrangement.

19. A household appliance according to claim 18, wherein said housing element constitutes at least a part of one of a door, a sidewall, or a top panel of said housing.

20. A household appliance according to claim 18, wherein a portion of said housing element is further transparent to at least one wavelength in an infrared area, and wherein said portion is provided with infrared to visible light converting means.

21. A household appliance comprising:

a housing;

a cavity within said housing;

a housing element, which is arranged to allow viewing of said cavity;

a display being arranged in connection to said housing element, wherein said display is transparent to at least one wavelength in the visible light spectrum, and is arranged such that said cavity is exposed from outside said household appliance, and wherein said display is a thin film type electroluminescent display arranged as an integral part of said housing element;

a control means for controlling operation of the household appliance, and wherein said display is arranged in communication with said control means; and detection means for detecting an action performed by a user, and for generating signals to the control means in response to said action.

* * * * *

UNITED STATES PATENT AND TRADEMARK OFFICE

CERTIFICATE OF CORRECTION

PATENT NO. : 8,654,515 B2
APPLICATION NO. : 13/127648
DATED : February 18, 2014
INVENTOR(S) : Bernd Krische It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 265 days.

Signed and Sealed this
Twenty-ninth Day of September, 2015

Michelle K. Lee
*Director of the United States Patent and Trademark Office*